United States Patent
Amaya-Benitez

(10) Patent No.: US 12,498,463 B2
(45) Date of Patent: Dec. 16, 2025

(54) TIME OF FLIGHT APPARATUS AND METHOD

(71) Applicant: Sony Semiconductor Solutions Corporation, Kanagawa (JP)

(72) Inventor: Manuel Amaya-Benitez, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1233 days.

(21) Appl. No.: 17/272,089

(22) PCT Filed: Sep. 5, 2019

(86) PCT No.: PCT/EP2019/073765
§ 371 (c)(1),
(2) Date: Feb. 26, 2021

(87) PCT Pub. No.: WO2020/049126
PCT Pub. Date: Mar. 12, 2020

(65) Prior Publication Data
US 2021/0325514 A1   Oct. 21, 2021

(30) Foreign Application Priority Data

Sep. 6, 2018   (EP) .................................... 18193003

(51) Int. Cl.
*G01S 7/484* (2006.01)
*G01B 11/22* (2006.01)
*G01S 7/481* (2006.01)
*G01S 17/894* (2020.01)

(52) U.S. Cl.
CPC .............. *G01S 7/484* (2013.01); *G01B 11/22* (2013.01); *G01S 7/4814* (2013.01); *G01S 7/4816* (2013.01); *G01S 17/894* (2020.01)

(58) Field of Classification Search
None
See application file for complete search history.

(56) References Cited

U.S. PATENT DOCUMENTS

| | | |
|---|---|---|
| 2012/0069176 A1 | 3/2012 | Park et al. |
| 2015/0109414 A1 | 4/2015 | Adam et al. |
| 2016/0079447 A1* | 3/2016 | Kriebernegg ........... G01S 7/487 250/214 AL |
| 2016/0223656 A1 | 8/2016 | Hall et al. |
| 2017/0016981 A1* | 1/2017 | Hinderling .............. G01S 7/487 |

(Continued)

FOREIGN PATENT DOCUMENTS

EP   2 594 959 B1   1/2017

OTHER PUBLICATIONS

International Search Report and Written Opinion mailed Nov. 12, 2019 in connection with International Application No. PCT/EP2019/073765.

(Continued)

*Primary Examiner* — Luke D Ratcliffe
(74) *Attorney, Agent, or Firm* — Wolf, Greenfield & Sacks, P.C.

(57) ABSTRACT

A time-of-flight apparatus has: a light source for emitting light pulses to a scene; a light detector for detecting light from the scene; and a control, the control being configured to: drive the light source to emit light pulses, based on a time shift pattern; and drive the light detector for detecting light in accordance with the time shift pattern.

20 Claims, 9 Drawing Sheets

(56) References Cited

U.S. PATENT DOCUMENTS

| | | |
|---|---|---|
| 2017/0052065 A1 | 2/2017 | Sharma et al. |
| 2018/0081041 A1 | 3/2018 | Niclass et al. |
| 2018/0227475 A1* | 8/2018 | Kishimoto .............. G06T 7/514 |
| 2019/0137607 A1* | 5/2019 | Kostamovaara ...... G01S 7/4863 |
| 2019/0310370 A1* | 10/2019 | Schmitz ................ G01S 7/4863 |
| 2019/0353787 A1* | 11/2019 | Petit ........................ G01S 7/484 |

OTHER PUBLICATIONS

Buttgen et al., Pseudonoise optical modulation for real-time 3-D imaging with minimum interference. IEEE Transactions on Circuits and Systems I: Regular Papers. Oct. 15, 2007;54(10):2109-19.

* cited by examiner

TIME OF FLIGHT APPARATUS AND METHOD

CROSS-REFERENCE TO RELATED APPLICATIONS

This application claims the benefit under 35 U.S.C. § 371 as a U.S. National Stage Entry of International Application No. PCT/EP2019/073765, filed in the European Patent Office as a Receiving Office on Sep. 5, 2019, which claims priority to European Patent Application Number 18193003.3, filed in the European Patent Office on Sep. 6, 2018, each of which is hereby incorporated by reference in its entirety.

TECHNICAL FIELD

The present disclosure generally pertains to a time-of-flight apparatus and a method for controlling a time-of-flight apparatus.

TECHNICAL BACKGROUND

Known time-of-flight systems have a light source for illuminating a region of interest and a sensor for detecting light stemming from the region of interest for determining a distance between the light source and the region of interest. The distance can be determined, for example, based on the time-of-flight of the photons of the light source reflected in the region of interest, which, in turn, is associated with the distance, and it can be based, for example, on a direct trip time of the light when travelling from the light source to the sensor.

Generally, it may happen that multiple time-of-flight cameras illuminating the same region of interest for performing distance or depth measurements, such that the measurements may cause interferences.

Although there exists a time-of-flight apparatus and a method for controlling a time-of-flight apparatus, it is generally desirable to provide a time-of-flight apparatus and a method for controlling a time-of-flight apparatus, which at least cause less interferences.

SUMMARY

According to a first aspect, the disclosure provides a time-of-flight apparatus, comprising a light source for emitting light pulses to a scene; a light detector for detecting light from the scene; and a control, the control being configured to: drive the light source to emit light pulses, based on a time shift pattern; and drive the light detector for detecting light in accordance with, the time shift pattern.

According to a first aspect, the disclosure provides a method for controlling a time-of-flight apparatus including a light source for emitting light pulses to a scene, and a light detector for detecting light from the scene, the method comprising driving the light source to emit light pulses, based on a time shift pattern; and driving the light detector for detecting light in accordance with the time shift pattern.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
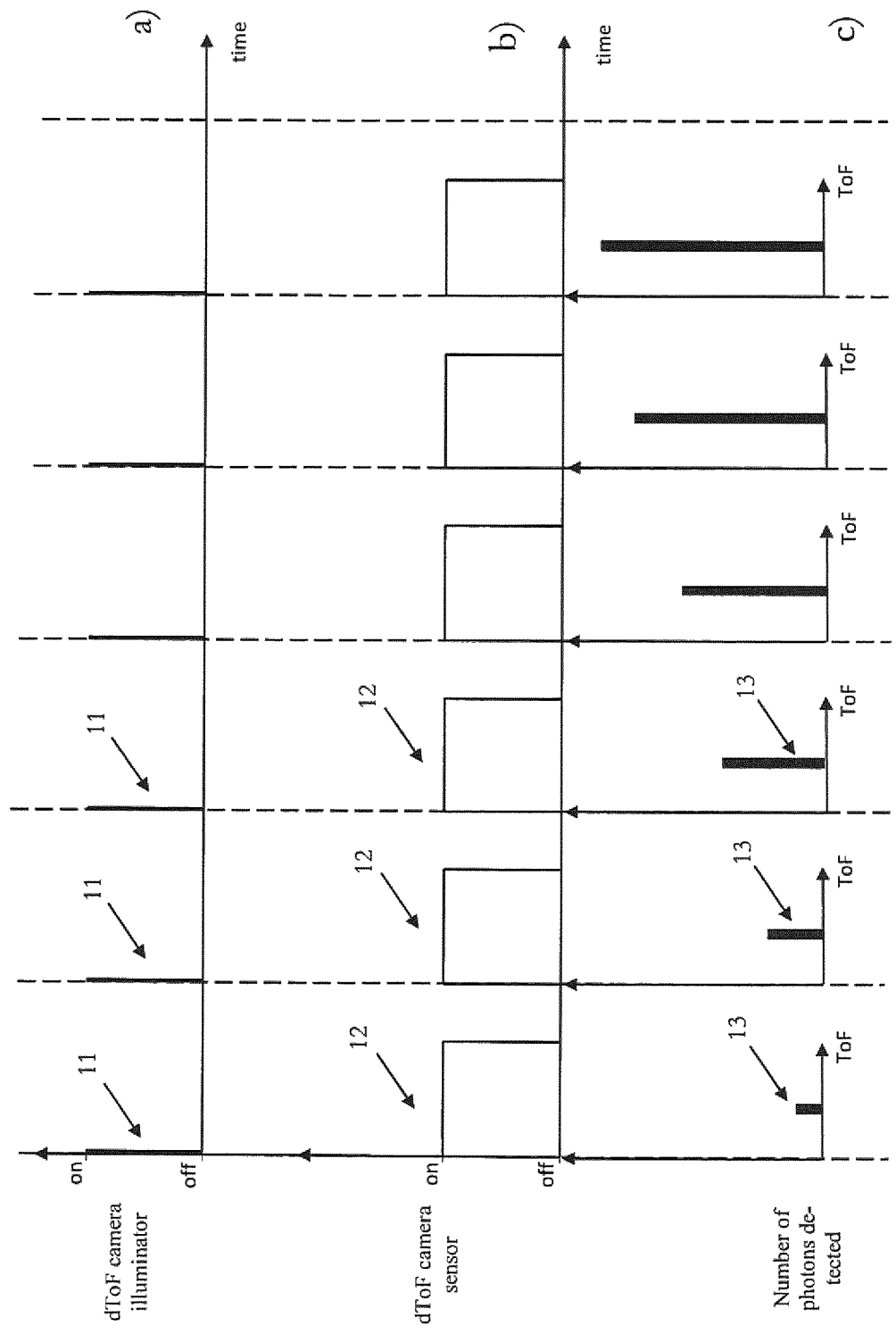
FIG. 1 illustrates an emission timing of light pulses and the associated detection of the light pulses of a common time-of-flight (ToF) camera.

Before a detailed description of the embodiments under reference of FIG. 1, general explanations are made.

As also indicated in the outset, time-of-flight (ToF) includes a variety of methods that measure the time that an object, particle or wave needs for traveling a distance in a medium. ToF cameras can obtain depth measurements of the objects in the scene, e.g. for every pixel of the image simultaneously.

Generally, ToF technology may be grouped in two main techniques, namely indirect ToF (iTOF) and direct ToF (dTOF).

An iToF camera indirectly obtains the depth measurements by recovering the phase of a correlation wave. An iToF pixel sensor demodulates, e.g. millions of illumination modulation cycles reflected in the scene for sampling the correlation wave, which is based on correlation obtained by correlating emitted and detected light. An iToF camera indirectly obtains depth measurements by recovering the phase of a sampled correlation wave. For each sample, e.g., an iToF pixel sensor correlates emitted and detected light, and by integrating the correlation for many modulation cycles, e.g. for millions of illumination modulation cycles reflected in the scene, the depth may be obtained.

A dToF camera directly obtains the depth measurements by measuring the time-of-flight of the photons emitted by the light source and reflected in the scene, e.g. based on hundreds of short illumination pulses sent.

As indicated in the introduction, when two or more asynchronous ToF cameras, i.e. cameras that are not sharing a coordination signal, try to obtain depth images of the same scene, they can experience crosstalk, i.e. the illumination of some cameras can interfere with the illumination of other cameras, to which may introduce errors in the measurements.

In a ToF multi-camera scenario, as described above, Space-Division Multiple Access (SDMA) or Wavelength-Division Multiple Access (WDMA) approaches may be considered. However, SDMA typically requires each ToF camera to illuminate different parts of the scene and WDMA typically requires many ToF sensor with different wavelength sensitivities.

Furthermore, technologies, such as Frequency-Division Multiple Access (TDMA), Code-Division Multiple Access (CDMA), Epipolar-ToF (EpiToF), and interference cancellation techniques may be envisaged in ToF multi-camera scenarios.

FDMA is based on the use of different modulation frequencies applied to the illumination of each camera. This technique suppresses the interferences when the illumination is modulated as a sinusoidal signal. However, for squarelike illuminations, this technique may not suppress the interferences satisfactory.

EpiToF images the scene by sweeping a sheet of illumination, what reduces the probability of interferences in a multi-camera scenario. However, typically, EpiTof has a complex hardware, and its performance and advantages may be limited by the amount of illumination power in use and the sensor readout time. In many applications, eye safety requirements may regulate the illumination power, resulting in a performance below other ToF solutions.

Known interference cancellation techniques may be useful for static scenes, but as known algorithms may need several frames of the same scene for removing the interference, it may not be useful for moving scenes.

In CDMA, a different code is super-imposed onto the modulation signal (illumination) of each camera. For indirect ToF (iToF) cameras, the application of this technique may be limited as it is necessary to sample the correlation wave, forcing the frequency of the chip to be equal or larger than the modulation frequency of the illumination, which, in turn, may result in limited capabilities for rejecting interferences. Furthermore, CDMA may not suppress the shot noise impact due to an interfering camera illumination.

It has been recognized that an asynchronous solution for avoiding interferences between (in particular) direct ToF (dToF) cameras illuminating the same scene simultaneously may be based on applying time shifts on emitted light pulses, as is also explained further below.

Consequently, some embodiments pertain to a time-of-flight apparatus, including a light source for emitting light pulses to a scene; a light detector for detecting light from the scene; and a control, the control being configured to drive the light source to emit light pulses, based on a time shift pattern; and drive the light detector for detecting light in accordance with the time shift pattern.

Generally, the time-of-flight apparatus may be based on any of known ToF technologies, including direct ToF sensors, where the roundtrip of photons emitted and scattered from the scene is directly measured. Some embodiments pertain to indirect ToF sensors, where a phase shift of emitted and from the scene scattered light is measured for determining the distance, or the like.

The light source may include LEDs (light emitting diodes) or it may be based, on laser elements, such as VCSELs (vertical cavity surface emitting lasers) or the like. The light source may be configured as PW (pulsed-wave) light source, which is configured to emit light pulses to the scene (region of interest or object or the like).

The light detector may be based on any type of known sensing technology for time-of-flight systems and may be based on, for example, CMOS (complementary metal-oxide semiconductor), CCD (charge coupled device), SPAD (single photon avalanche diode), CAPD (current assisted photodiode) technology or the like.

Moreover, the light detector may include multiple pixels, which may be arranged in an array, as it is generally known in the art. The light detection, in particular for direct time-of-flight apparatus, may have a small number of pixel (e.g. 64 by 64 pixels), but in other embodiments, the number of pixels may be smaller (e.g. 32×32, 16×16, 16×32, etc.) or larger (e.g. 128×128 pixels, 256×256, etc.)

The control may include one or more (micro)processors, field gate processors, memory, and other components which are typically implemented in an electronic control of a time-of-flight system.

The control may be configured in hardware and/or in software.

As mentioned, the control drives the light source to emit light pulses, based on a time shift pattern and drives the light detector for detecting light in accordance with the time shift pattern. Hence, by applying predefined or specific time shifts included in the time shift pattern to the emitted light pulses, the emission of the light pulses may be unique for the time-of-flight apparatus, such that in the case that multiple ToF apparatus simultaneously illuminate the same scene, each ToF apparatus detects their own emitted light pulses, since they each have a unique time shift pattern. The time shift pattern may define different values of time shifts and/or the order in which the (different) time shifts should be applied to light pulses, which are typically emitted consecutively. The time shift pattern may be predefined and stored, for example, in a memory of the ToF apparatus, it may be generated dynamically, based on a predefined rule, it may be generated based on a random number generator, it may be adjusted based on a user input, etc.

The light detector is driven for detecting light in accordance with the time shift pattern, which may is involve that an active time window for detecting photons or the like may start on the basis of the applied time shifts.

In some embodiments, a (direct) ToF apparatus or camera may send several illumination or light pulses and builds, e.g., an event histogram per pixel of the light detector with all photon arrival times (time-of-flight) of the scene reflecting the emitted illumination or light pulses, without limiting the is present disclosure in the regard, since also other peak detection methods for detected photons may be implemented as is generally known to the skilled person. As each time-of-flight apparatus may have its unique time shift pattern, only the correct photons will cause a peak in the detection, while photons of other ToF apparatus may only be visible as noise, but, typically, will not cause a peak in such a histogram or other peak detection method.

The ToF apparatus or system, may be used in different technology applications, such as in Automotive, Gaming applications (e.g. gesture detection), as well as in smart phones, mobile phones, or other electronic devices, such as computers, laptops, or in medical devices, drones, surveillance cameras, etc.

Some embodiments pertain to a method for controlling a time-of-flight apparatus (as discussed herein) including alight source for emitting light pulses to a scene, and a light detector for detecting light from the scene, the method including driving the light source to emit light pulses, based on a time shift pattern; and driving the light detector for detecting light in accordance with the time shift pattern, as discussed above.

In the following, different embodiments are discussed which pertain to the time-of-flight apparatus and the configuration of the control, wherein each of the features which are discussed are also part of the method for controlling the time-of-flight apparatus.

In some embodiments, the time shift pattern includes at least one-time shift to be applied to the emitted light pulses. The at least one-time shift may be applied to several emitted light pulses, a group of emitted light pulses, or to each of the emitted light pulses. The time shift may be positive, i.e. the emission of the light pulse may be delayed or it may be negative, i.e. the light pulse may be emitted earlier.

In some embodiments, the time shift pattern includes at least two different time shifts applied to at least two consecutive emitted light pulses.

In some embodiments, the time shift pattern is associated with a time interval. The time interval may include a predefined number of light pulses, and, thus, the time shift pattern may include time shifts to be applied to the predefined number of light pulses. Also a group of light pulses may be emitted within the time interval and the time shift pattern may include time shifts to be applied to each of the light pulses of the group of light pulses. These time shifts may be equal or they may be different and the time shift pattern may define the order in which the time shifts are applied to the pulse of the group of pulses.

In some embodiments, the time shift pattern is based on randomized time shifts. Hence, the values of the time shifts may be randomized and/or the order of the time shifts to be applied may be randomized.

In some embodiments, the time shift pattern is based on a predefined code, in particular on a code which may be such configured that different codes have only a small correlation, such as it is the case for a Gold code. In principle, any kind of code can be used which may be able to make the ToF apparatus unique to some extent.

In some embodiments, the time shift pattern includes fixed time shifts, wherein the time shifts may be applied randomly to the emitted light pulses or based on a code, e.g. a Gold code.

For instance, the time shift is applied to a light pulse, if a bit of the Gold code is equal to one (or equal to zero).

In some embodiments, the time shift pattern includes time shifts, which are smaller than a predefined value, wherein the predefined value is based on an expected roundtrip delay for the detected light. Hence, an expected roundtrip delay for photons emitted from the light source, scattered by the scene and detected by the light detector may be measured or estimated and the time shift to be applied may be smaller than this roundtrip delay, in order to avoid that the time shift overlaps the roundtrip delay.

In the following, principles of the present disclosure will be discussed under reference of the FIGS. 1 to 9, wherein for FIGS. 1 to 4 the situation for emission and detection of light pulses for common ToF cameras will be explained in order to enhance the understanding of the teaching of the present disclosure.

Returning to FIG. 1, there is illustrated an emission timing of light pulses and the associated detection of the light pulses of a common ToF camera.

FIG. 1 shows in a section a) the states of the light source, namely the timing of a light source emitting short light pulses 11 in different frames to a scene, wherein each light pulse 11 is emitted at the same point of time in the different frames, namely at the beginning.

Section b) of FIG. 1 illustrates states of the light detection, namely active time intervals 12, where the light detector of the ToF camera is active and detects light scattered back from a scene illuminated with light pulses 11 (e.g. photons of each of the emitted light pulses 11). The dToF sensor is active long enough in each active time interval 12, to register the maximum time-of-flight based on the distance range (e.g. =300 m, where the roundtrip delay of the light is roughly $2000*10^{-9}$ s).

Section c) of FIG. 1 illustrates a histogram, which shows events for each frame, wherein for each detected photon a peak 13 in the histogram is increased. The peak 13 of the histogram is correlated with an arrival time of the detected photons, which in turn is indicative of the roundtrip delay of the emitted photons, and, thus, of the measured distance between the ToF camera and the illuminated scene.

Figure 2:
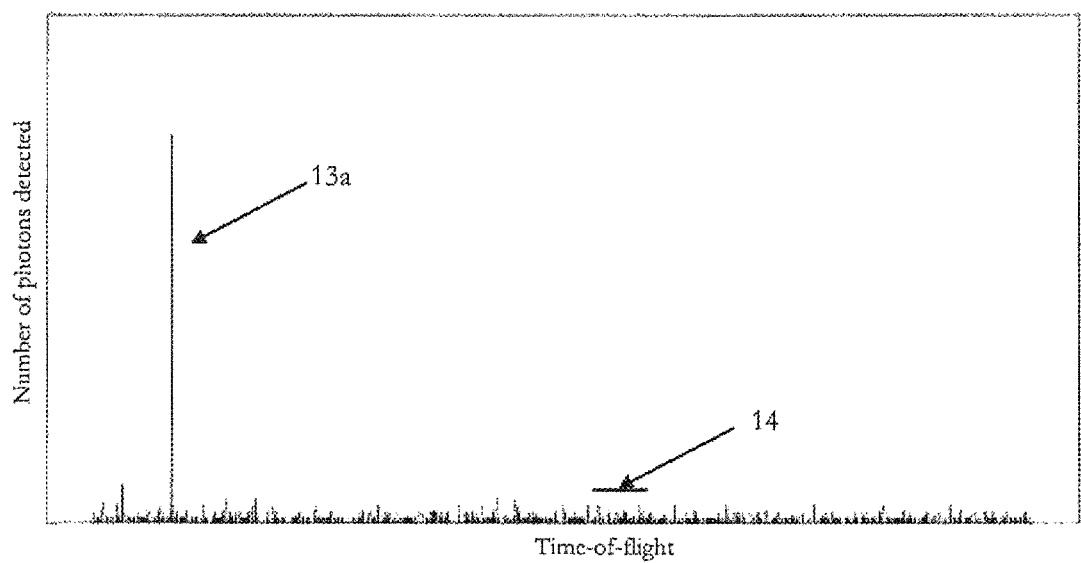
FIG. 2 illustrates an event histogram of a light detector.

Once such a histogram is completed, e.g. after measurement of several hundreds of light pulses, as a general method which is also implemented in some embodiments, typically a first significant peak of the histogram above the noise threshold represents the time that an illumination (light) pulse needs to travel from the camera to be scattered in the scene and to return, to be detected in the sensor of the dToF camera, as is also illustrated in FIG. 2, which shows a peak 13a which is much larger than the noise denoted with reference number 14. In the histogram of FIG. 2, the width of each bin is 1 ns and in this case, the illumination pulses need 200 ns to travel from the camera to the scene and return back to the camera.

As mentioned, based on the detection of the arrival times, the distance from the camera to the scene and with a sensor pixel array depth maps of the scene may be generated.

If the number of cameras that simultaneously illuminates the scene is more than one or even large, multiple undesired effects can appear, e.g. multiple relevant peaks in the histograms may occur or a saturation of the pixels may occur, as will be explained under reference of FIGS. 3 and 4 in the following.

Figure 3:
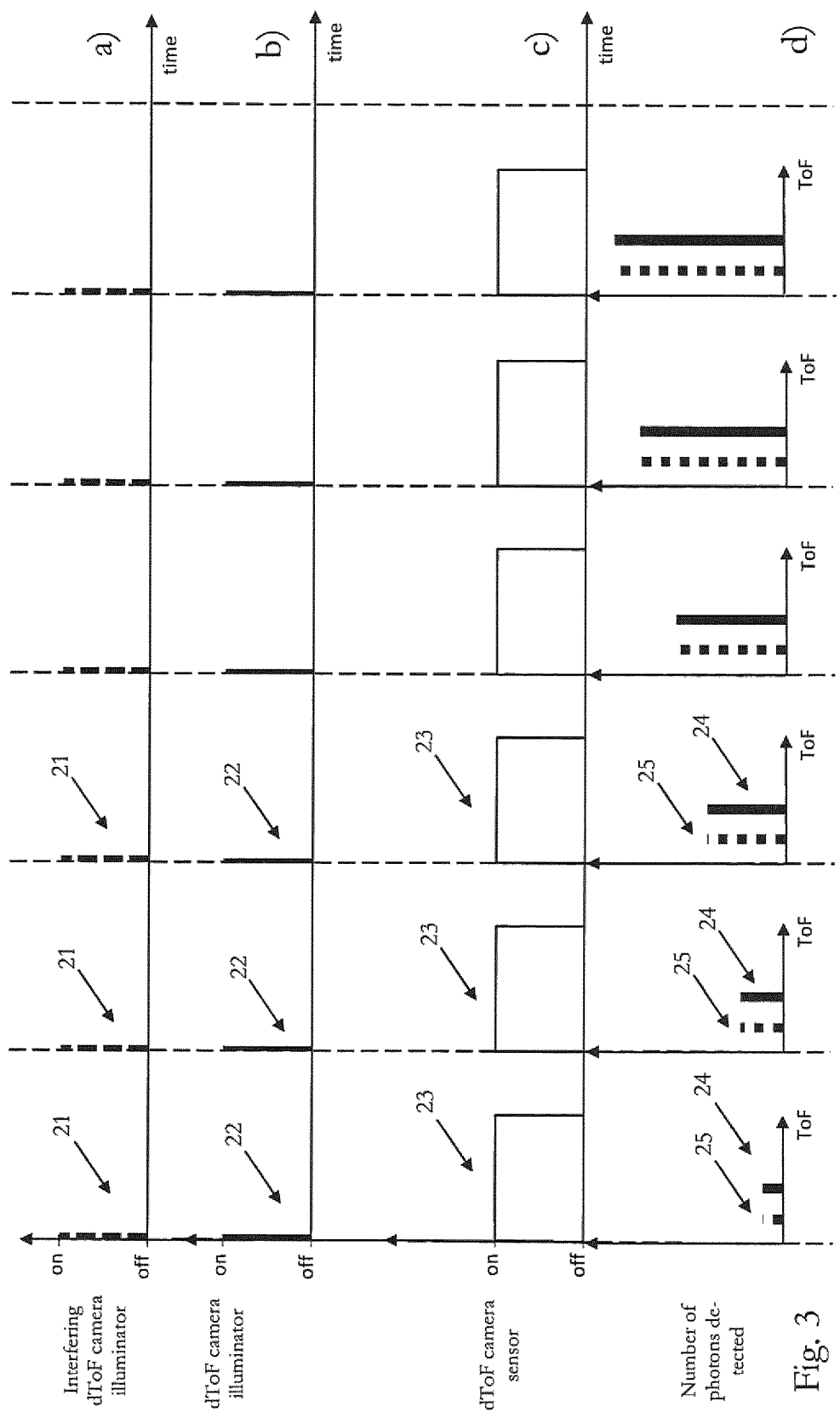
FIG. 3 illustrates the effects of an interfering direct ToF (dToF) camera, which simultaneously emits light pulses with another dToF camera.

FIG. 3 also shows the effects of an interfering dToF camera, which simultaneously emits light pulses.

Section a) of FIG. 3 illustrates the states of the light source of a first camera (interfering) and section b) of a second camera (wanted), namely the timing of a light source emitting short light pulses 21 and 22, respectively, in different frames to a scene, wherein each light pulse 21 and 22 is emitted at the same point of time in the different frames, namely at the beginning.

Section c) of FIG. 3 illustrates states of the light detection for the second dToF camera (wanted), namely active time intervals 23, where the light detector of the ToF camera is active and detects light scattered back from a scene illuminated with light pulses 21 and 22.

Section d) of FIG. 3 illustrates a histogram of the second camera (wanted), which shows events for each frame, wherein for each detected photon a peak 24 and 25 in the histogram is increased. Both peaks 24 and 25 of the histogram are correlated with an arrival time of the detected photons. However, as the both cameras (interfering and wanted) emitted light pulses simultaneously to the scene the back scattered photons are also detected simultaneously and, thus, it cannot be determined which of the peaks 24 and 25 is caused by the own light source and the own emitted light pulses. The different arrival times of the peaks 24 and 25 are caused by the different distances of the two cameras to the same scene.

Figure 4:
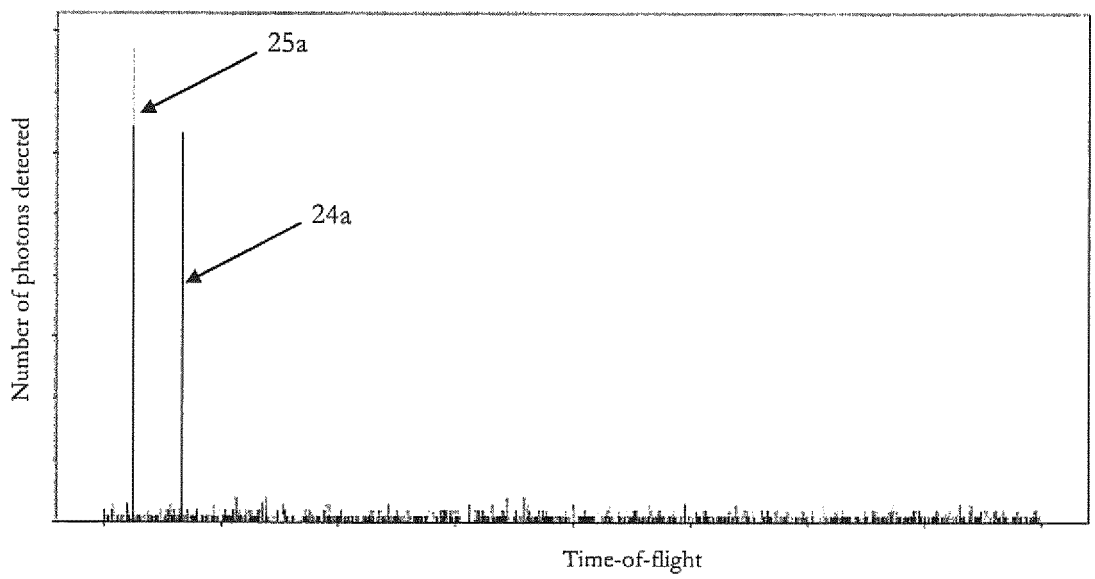
FIG. 4 illustrates an event histogram of the light detector, which detects the scattered photons of two dToF cameras.

FIG. 4 shows a histogram similar to that of FIG. 2, which is based on the example of FIG. 3, wherein in the present histogram two peaks 24a and 25a occur, wherein the width of each bin is 1 ns. In this case, a possible effect of an interfering camera is illustrated by showing an interfering pulse 25a, which is detected at 75 ns, what would result in an incorrect depth measurement.

Figure 5:
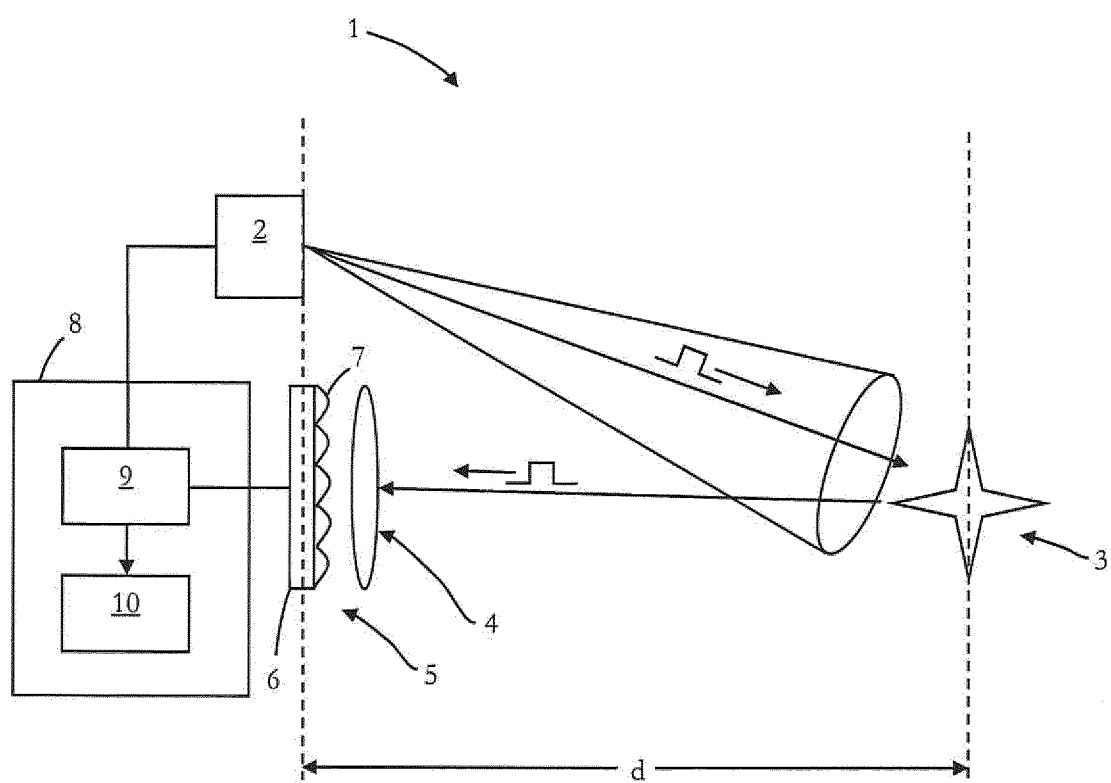
FIG. 5 illustrates an embodiment of a dToF apparatus (system)

FIG. 5 illustrates an embodiment of a direct time-of-flight (ToF) apparatus (system) 1, which can be used for depth sensing or providing a distance measurement and which has a circuitry 8 which is configured to perform the methods as discussed herein (and which will be discussed further below) and which forms a control of the ToF apparatus 1 (and it includes, not shown, corresponding processors, memory and storage as it is generally known to the skilled person).

The ToF apparatus 1 has a pulsed light source 2 and it includes light emitting elements (based on laser, diodes), wherein in the present embodiment, the light emitting elements are narrow band laser elements.

The light source 2 emits pulsed light to a scene 3 (region of interest or object), which reflects the light. By repeatedly emitting light to the scene 3, the scene 3 can be scanned, as it is generally known to the skilled person and as it is also discussed herein. The reflected light is focused by an optical stack 4 to a light detector 5.

The light detector 5 has an image sensor 6, which is implemented based on multiple SPADs (Single Photon Avalanche Diodes) formed in an array of pixels and a microlens array 7 which focuses the light reflected from the scene 3 to the image sensor 6 (to each pixel of the image sensor 6).

The light emission time information is fed from the light source 2 to the circuitry or control 8 including a time-of-flight measurement unit 9, which also receives respective time information from the image sensor 6, when the light is detected which is reflected from the scene 3. On the basis of the emission time information received from the light source 2 and the time of arrival information received from the image sensor 6, the time-of-flight measurement unit 9 computes a round-trip time of the light emitted from the light source 2 and reflected by the scene 3 and on the basis thereon it computes a distance d (depth information) between the image sensor 6 and the scene 3.

The depth information is fed from the time-of-flight measurement unit 9 to a 3D image reconstruction unit 10 of the circuitry 8, which reconstructs (generates) a 3D image of the scene 3 based on the depth information received from the time-of-flight measurement unit 9.

Figure 6:
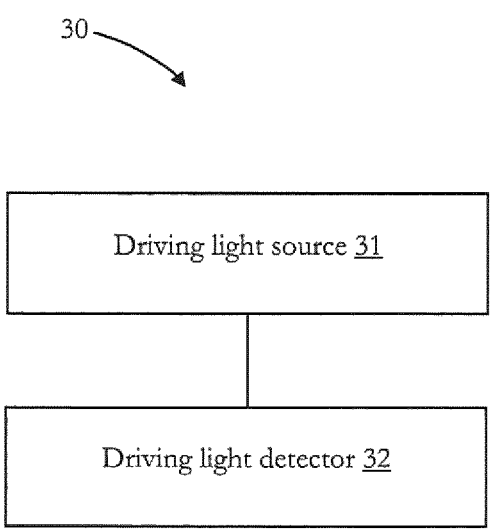
FIG. 6 is a flow chart of a method for controlling a time-of-flight apparatus.

A method 30 for controlling, e.g., the direct ToF apparatus 1 of FIG. 5 is discussed in the following under reference of FIG. 6 showing a flow chart of the method 30.

As discussed above and as is discussed under reference of FIGS. 7 to 9 further below, at 31 the method 30 includes driving the light source 2 to emit light pulses, as discussed, based on a time shift pattern, and at 32 it includes driving the light detector 5 for detecting light in, accordance with the time shift pattern, as discussed.

Hence, based on the time shift pattern including n time-shifts $\Delta t_n$, a time-shift $\Delta t_n$ is added to the n-pulses which are emitted by the light source 2 and detected by the light detector 5 to obtain the time of the events (photon arrivals), wherein the light source 2 and the light detector 5 are synchronized accordingly. As the time shift patterns are unique for the ToF apparatus, different $\Delta t_n$ sequences of different dToF cameras typically have a low correlation, such that the time-of-flight of the photons of an interference are different and, thus, the associated events are spread through the arrival times, and therefore are not detected as a false peak, but they are distributed, and, thus, slightly increased noise.

Figure 7:
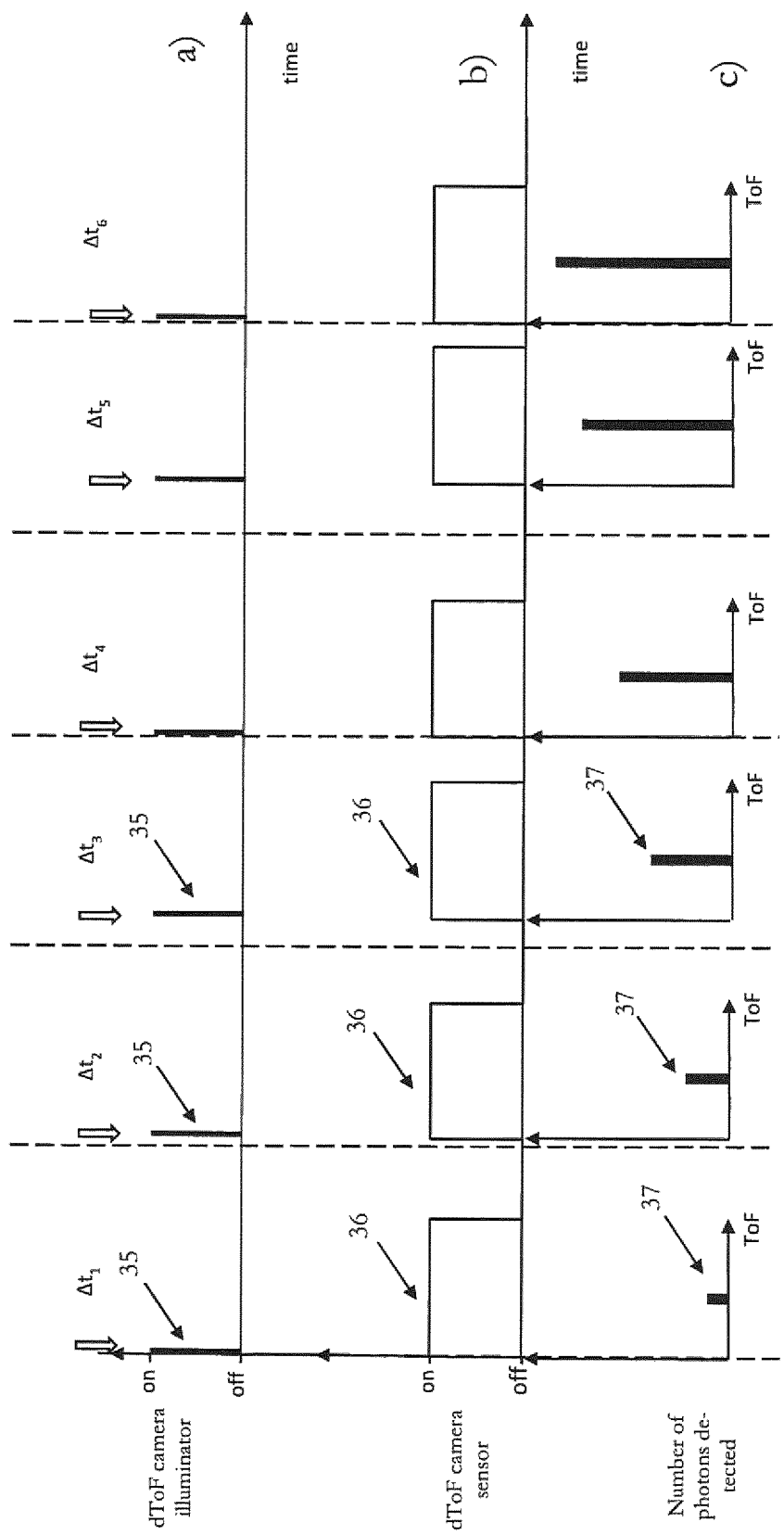
FIG. 7 illustrates an embodiment of a random based time shift pattern.
Figure 8:
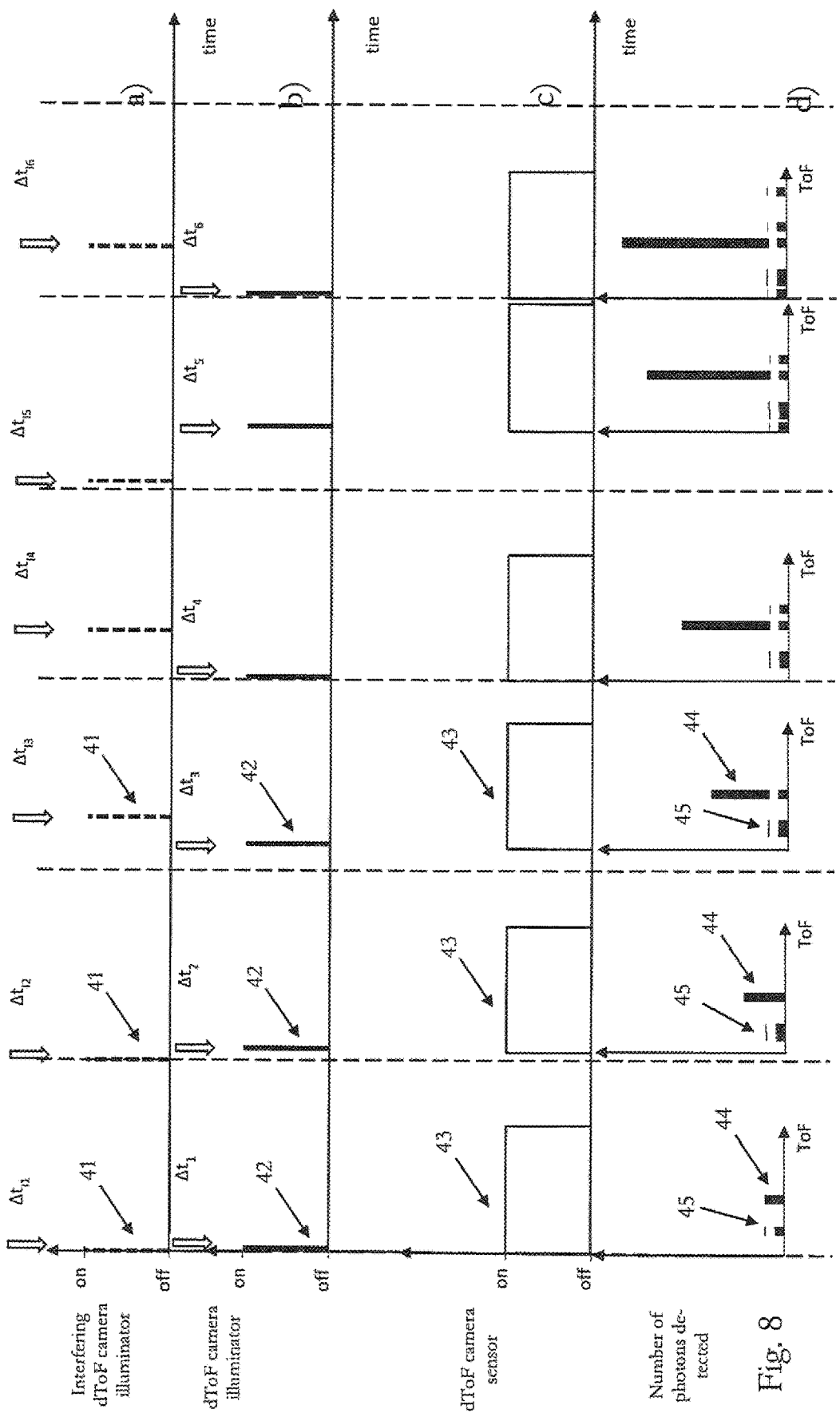
FIG. 8 illustrates the effect of the embodiment of FIG. 7 in a multi-camera or multi dToF apparatus situation.
Figure 9:
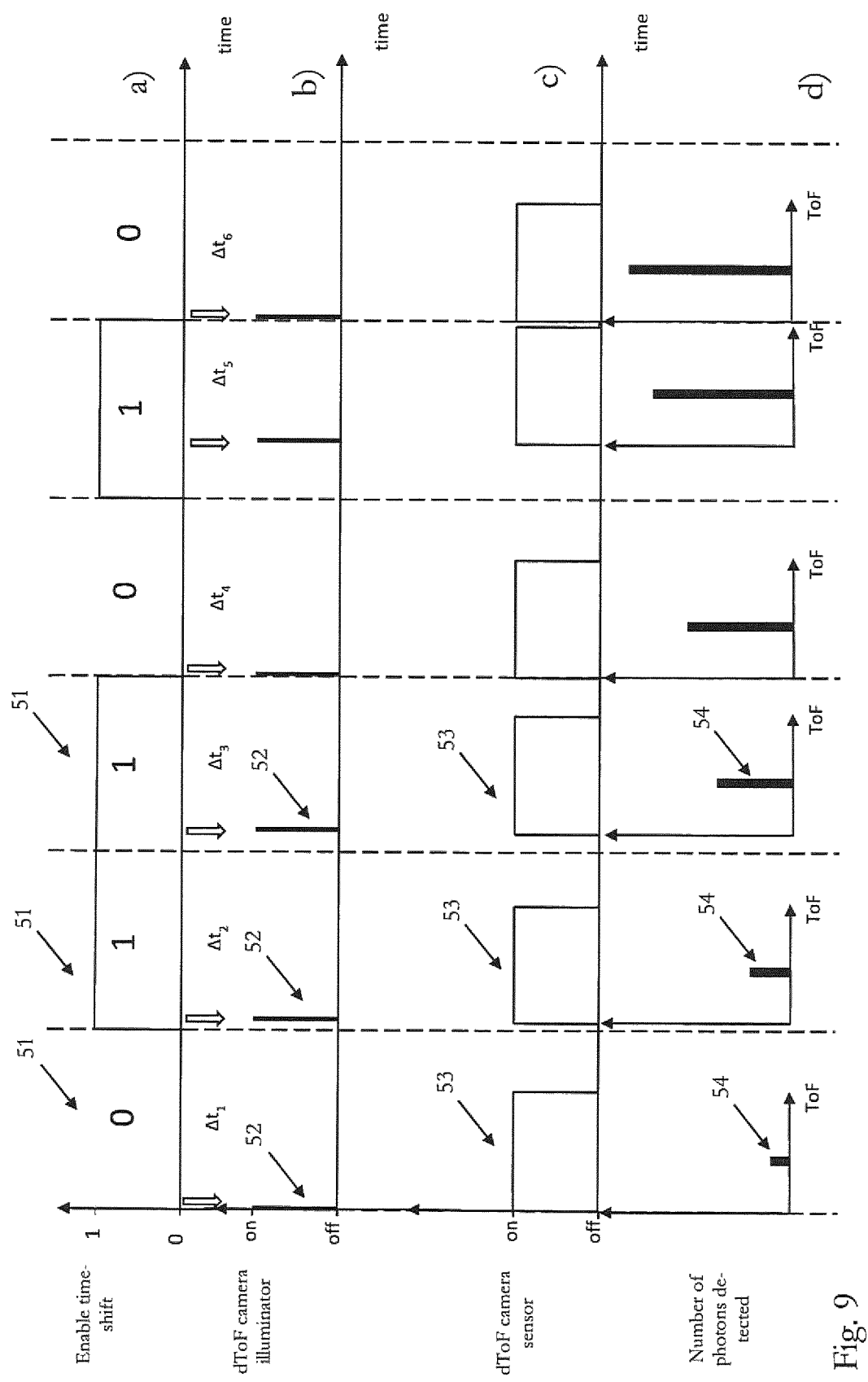
FIG. 9 illustrates an embodiment which is based on a Gold Code.

In the following two embodiments of time shift patterns are discussed under reference of FIGS. 7 to 9, which may be implemented in the embodiments of FIGS. 5 and 6, wherein an embodiment of random based time shift pattern is illustrated in FIGS. 7 and 8 and a Gold code-based embodiment is illustrated in FIG. 9. The embodiments of FIGS. 7 to 9 will refer to the ToF apparatus 1 of FIG. 5 and the method 30 of FIG. 6 for explanation purposes and without limiting the present disclosure in that regard.

FIG. 7 illustrates, as mentioned, an embodiment where the time shift pattern is based on a pseudo-random uniform distribution of time-shifts $\Delta t_n$. In this embodiment, $\Delta t_n$ values are in the interval of $[0, t_{max}]$, wherein $t_{max}$ is the largest time-of-flight or roundtrip delay expected from the emitted and scattered photons. Without limiting the present disclosure in that regard, in this embodiment $t_{max}=2000*10^{-9}$ s (in other embodiments, other intervals are implemented, for instance $[-t_{max}, t_{max}]$ or the like). Using a different seed for the pseudo-random generator of each different ToF apparatus, such as ToF apparatus 1, interferences produced by other ToF apparatus can be avoided.

FIG. 7 shows in section a) the states of the illumination, i.e. driving (31) of the, light source 2, in section b) the states of the light detector 5 and its driving (32), and in section c) how the histogram of each pixel of the light detector 5 is built.

At each n-pulse 35 emitted by the light source 2 a time shift $\Delta t_n$ of the time shift pattern is introduced, wherein the time shifts $\Delta t_n$ are random (including that a time shift $\Delta t_n$ may be equal to zero).

As can be taken from section a) of FIG. 7, the light pulses 35 are emitted in frame-like structure and the time shift $\Delta t_n$ refers to the start of each frame and, thus, indicates in this embodiment a time shift with respect to the start of each frame. In a first frame, a time shift $\Delta t_1$ is applied (which is zero), in the second frame a time shift $\Delta t_2$ is applied, in the third frame a time shift $\Delta t_3$ is applied, etc., wherein the time shifts differ from each other (since they are random).

The same time shift is applied for driving the light detector 5, as can be taken from section b) of FIG. 7, where for each frame an active time interval 36 for detecting photons stemming from the associated light pulse 35, is shifted by the according time-shift $\Delta t_n$, i.e. $\Delta t_1$ for the first frame, $\Delta t_2$ for the second frame, $\Delta t_3$ for the third frame, etc., such that the light detector 5 and the light source 2 are synchronized to each other.

Section c) of FIG. 7 illustrates a resulting event histogram showing detected photons which are emitted by the light pulses 5, wherein a corresponding peak 37 occurs which increases for each frame, since further photons are detected at the corresponding arrival time of the photons.

FIG. 8 illustrates the embodiment of FIG. 7 in a multi-camera or multi ToF apparatus scenario, wherein two direct time-of-flight cameras illuminate the same scene simultaneously, but both use a different time shift pattern of the embodiment of FIG. 7, such that an interference is avoided or at least very unlikely.

FIG. 8 shows in section a) the states of the illumination, i.e. driving of the light source of a first ToF apparatus (interfering) using a first time shift pattern for emitting light pulses 41 and in section b) the states of the illumination, i.e. driving of the light source of a second ToF apparatus (wanted) using a second time shift pattern for emitting light pulses 42, as explained for section a) of FIG. 7 and the associated embodiment, wherein the first and the second time shift patterns are based on a different random distribution of time shifts, and, thus, have no or low correlation.

The first ToF apparatus of section a), which is considered to interfere with the second ToF apparatus of section b), has the first-time shift pattern including time shifts $\Delta t_n$, wherein the second ToF apparatus of section b) has the second time shift pattern including time shifts $\Delta t_n$.

Section c) of FIG. 8 (as discussed for section b) of FIG. 7), illustrates the driving of the light detector of the second ToF (wanted) and, thus, the time shifts of section b) are applied for shifting active time intervals 43 for detecting photons stemming from the associated light pulses 42 accordingly.

A resulting histogram for the second ToF apparatus (wanted) is illustrated in section d) of FIG. 8, which shows the photon arrival times of the first and second ToF apparatus.

As the light detector of the second ToF apparatus is synchronized with the time shift pattern applied for emitting the light pulses 42 of the light source, only the photons emitted by the light pulses 42 are detected as an associated peak 44 at a correspond arrival time, whereas the photons emitted by the first ToF apparatus in light pulses 41 are spread over the histogram as noise 45 due to the applied time shift pattern, such that the overall noise may be slightly increased.

FIG. 9 illustrates an embodiment, wherein the time shift pattern is based on a Gold code, which has a high auto-correlation but a low correlation between different Gold codes.

The Gold code is unique and in the present embodiment it includes 127 bits per ToF apparatus. Assuming that a histogram, as also illustrated in section d) of FIG. 9, for detecting arrival times of photons has 1270 bins, for each ten bins one bit of the Gold code is assigned.

Moreover, the time shifts $\Delta t_n$ of the time shift pattern are calculated based on $\Delta t_n = 10 * \text{bin\_width} * n * \text{code\_bit}$, wherein n is the number of the pulse and wherein the $\Delta t_n$ is applied in the case that the code_bit is equal to one.

This is also illustrated in section a) of FIG. 9 which shows bits 51 of the Gold code for different frames, wherein in the first frame (n=1) the bit=0, in the second (n=2) the bit=1, in the third (n=3) the bit=1, in the fourth the bit=0, etc.

Hence, an according time shift $\Delta t_n$ is only applied in a frame n in the case that, the associated Gold code bit for that frame n is equal to 1, otherwise the applied time shift is equal to zero.

This is also illustrated in section b) of FIG. 9, which shows light pulses 52 emitted by the light source 2 of the ToF device 1, wherein the associated time shift $\Delta t_n$ is applied when the associated Gold code bit is equal to 1, as explained above.

As also explained above, in section c) of FIG. 9 the driving of the light detector 5 of the ToF device 1 is illustrated, wherein active time intervals 53 for the light detector 5 are synchronized with the light source 2, such that the time-shifts $\Delta t_n$ which are applied to the light pulses 52 are correspondingly applied to the active time intervals 53 in order to detect the emitted photons accordingly.

The resulting histogram is illustrated in section d) of FIG. 9, wherein a peak 54 is generated at the associated arrival time of the photons emitted with the light pulses 52.

The methods as described herein are also implemented in some embodiments as a computer program causing a computer and/or a processor and/or circuitry to perform the method, when being carried out on the computer and/or processor and/or circuitry. In some embodiments, also a nontransitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

Please note that the division of the control 8 into units 9 to 10 is only made for illustration purposes and that the present disclosure is not limited to any specific division of functions in specific units. For instance, the control 8 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight apparatus, comprising;
a light source for emitting light pulses to a scene;
a light detector for detecting light from the scene; and
a control, the control being configured to:
drive the light source to emit light pulses, based on a time shift pattern; and
drive the light detector for detecting light in accordance with the time shift pattern.

(2) The time-of-flight apparatus according to (1), wherein the time shift pattern includes at least one time shift to be applied to the emitted light pulses.

(3) The time-of-flight apparatus according to anyone of (1) to (2), wherein the time shift pattern includes at least two different time shifts applied to at least two consecutive emitted light pulses.

(4) The time-of-flight apparatus according to anyone of (1) to (3), wherein the time shift pattern is associated with a time interval.

(5) The time-of-flight apparatus according to (4), wherein a group of light pulses is emitted within the time interval and wherein the time shift pattern includes time shifts to be applied to each of the light pulses of the group of light pulses.

(6) The time-of-flight apparatus according to anyone of (1) to (5), wherein the time shift pattern is based on randomized time shifts.

(7) The time-of-flight apparatus according to anyone of (1) to (6), wherein the time shift pattern is based on a predefined code.

(8) The time-of-flight apparatus according to (7), wherein the code is a Gold code.

(9) The time-of-flight apparatus according to anyone of (7) to (8), wherein the time shift patterns includes fixed time shifts.

(10) The time-of-flight apparatus according to anyone of (1) to (9), wherein the time shift pattern includes time shifts which are smaller than a predefined value, wherein the predefined value is based on an expected roundtrip delay for the detected light.

(11) A method for controlling a time-of-flight apparatus, in particular according to anyone of (1) to (10), including a light source for emitting light pulses to a scene, and a light detector for detecting light from the scene, the method comprising:
driving the light source to emit light pulses, based on a time shift pattern; and
driving the light detector for detecting light in accordance with the time shift pattern.

(12) The method according to (11), wherein the time shift pattern includes at least one time shift to be applied to the emitted light pulses.

(13) The method according to anyone of (11) to (12), wherein the time shift pattern includes at least two different time shifts applied to at least two consecutive emitted light pulses.

(14) The method according to anyone of (11) to (13), wherein the time shift pattern is associated with a time interval.

(15) The method according to (14), wherein a group of light pulses is emitted within the time interval and wherein the time shift pattern includes time shifts to be applied to each of the light pulses of the group of light pulses.

(16) The method according to anyone of (11) to (15), wherein the time shift pattern is based on randomized time shifts.

(17) The method according to anyone of (11) to (16), wherein the time shift pattern is based on a predefined code.

(18) The method according to (17), wherein the code is a Gold code.

(19) The method according to anyone of (17) to (18), wherein the time shift patterns includes fixed time shifts.

(20) The method according to anyone of (11) to (19), wherein the time shift pattern includes time shifts which are smaller than a predefined value, wherein the predefined value is based on an expected roundtrip delay for the detected light.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A time-of-flight apparatus, comprising:
a light source for emitting light pulses to a scene;
a light detector for detecting light from the scene; and
a control, the control being configured to:
drive the light source to emit light pulses, based on a time shift pattern; and
drive the light detector for detecting light to only be active in accordance with the time shift pattern
wherein the transition from an inactive state of the light detector to an active state of the light detector is based on synchronization with the light source, the synchronization being in accordance with the time shift pattern, and
wherein the active state of the light detector is longer than the active state of the light source.

2. The time-of-flight apparatus of claim 1, wherein the time shift pattern includes at least one time shift to be applied to the emitted light pulses.

3. The time-of-flight apparatus of claim 1, wherein the time shift pattern includes at least two different time shifts applied to at least two consecutive emitted light pulses.

4. The time-of-flight apparatus of claim 1, wherein the time shift pattern is associated with a time interval.

5. The time-of-flight apparatus of claim 4, wherein a group of light pulses is emitted within the time interval and wherein the time shift pattern includes time shifts to be applied to each of the light pulses of the group of light pulses.

6. The time-of-flight apparatus of claim 1, wherein the time shift pattern is based on randomized time shifts.

7. The time-of-flight apparatus of claim 1, wherein the time shift pattern is based on a predefined code.

8. The time-of-flight apparatus of claim 7, wherein the code is a Gold code.

9. The time-of-flight apparatus of claim 7, wherein the time shift pattern includes fixed time shifts.

10. The time-of-flight apparatus of claim 1, wherein the time shift pattern includes time shifts which are smaller than a predefined value, wherein the predefined value is based on an expected roundtrip delay for the detected light.

11. A method for controlling a time-of-flight apparatus including a light source for emitting light pulses to a scene, and a light detector for detecting light from the scene, the method comprising:
driving the light source to emit light pulses, based on a time shift pattern; and
driving the light detector for detecting light to only be active in accordance with the time shift pattern
wherein a transition from an inactive state of the light detector to an active state of the light detector is based on synchronization with the light source, the synchronization being in accordance with the time shift pattern, and
wherein the active state of the light detector is longer than the active state of the light source.

12. The method of claim 11, wherein the time shift pattern includes at least one time shift to be applied to the emitted light pulses.

13. The method of claim 11, wherein the time shift pattern includes at least two different time shifts applied to at least two consecutive emitted light pulses.

14. The method of claim 11, wherein the time shift pattern is associated with a time interval.

15. The method of claim 14, wherein a group of light pulses is emitted within the time interval and wherein the time shift pattern includes time shifts to be applied to each of the light pulses of the group of light pulses.

16. The method of claim 11, wherein the time shift pattern is based on randomized time shifts.

17. The method of claim 11, wherein the time shift pattern is based on a predefined code.

18. The method of claim 17, wherein the code is a Gold code.

19. The method of claim 17, wherein the time shift pattern includes fixed time shifts.

20. The method of claim 11, wherein the time shift pattern includes time shifts which are smaller than a predefined value, wherein the predefined value is based on an expected roundtrip delay for the detected light.

* * * * *